(12) United States Patent
Schlarb et al.

(10) Patent No.: US 6,348,528 B1
(45) Date of Patent: Feb. 19, 2002

(54) AQUEOUS POLYMER DISPERSION CONTAINING AN EMULSIFIER WITH PHOSPHATE GROUPS

(75) Inventors: Bernhard Schlarb, Ludwigshafen; Gregor Ley, Wattenheim; Cheng-Le Zhao, Schwetzingen; Alexander Haunschild, Speyer; Maria Gyopar Rau, Hassloch; Rolf Dersch, Neustadt, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/623,459

(22) PCT Filed: Feb. 27, 1999

(86) PCT No.: PCT/EP99/01293

§ 371 Date: Sep. 12, 2000

§ 102(e) Date: Sep. 12, 2000

(87) PCT Pub. No.: WO99/46337

PCT Pub. Date: Sep. 16, 1999

(30) Foreign Application Priority Data

Mar. 12, 1998 (DE) .......................................... 198 10 658

(51) Int. Cl.$^7$ ................................................. C08K 5/52

(52) U.S. Cl. ...................................................... 524/141

(58) Field of Search ........................................ 524/141

(56) References Cited

U.S. PATENT DOCUMENTS

| | | | |
|---|---|---|---|
| 4,233,198 A | | 11/1980 | Noelken |
| 5,286,820 A | * | 2/1994 | Borges ....................... 526/193 |
| 5,324,354 A | | 6/1994 | Jesse et al. |
| 6,117,915 A | * | 9/2000 | Pereira ....................... 516/57 |

FOREIGN PATENT DOCUMENTS

| | | |
|---|---|---|
| DE | 27 43 764 | 4/1979 |
| EP | 0 115 468 | 8/1984 |
| EP | 0 221 498 | 5/1987 |
| EP | 0 395 988 | 11/1990 |

\* cited by examiner

*Primary Examiner*—Paul R. Michl
(74) *Attorney, Agent, or Firm*—Oblon, Spivak, McClelland, Maier & Neustadt, P.C.

(57) ABSTRACT

Aqueous polymer dispersion comprising from 0.1 to 10 parts by weight per 100 parts by weight of polymer of an emulsifier A) having a phosphate group, wherein said emulsifier consists at least 50% by weight of ethylene oxide and propylene oxide groups and the proportion of the ethylene oxide groups and propylene oxide groups is in each case at least 10% by weight, based on the overall amount of the ethylene oxide and propylene oxide groups.

9 Claims, No Drawings

AQUEOUS POLYMER DISPERSION CONTAINING AN EMULSIFIER WITH PHOSPHATE GROUPS

The invention relates to an aqueous polymer dispersion comprising from 0.1 to 10 parts by weight per 100 parts by weight of polymer of an emulsifier A) having a phosphate group, wherein said emulsifier consists at least 50% by weight of ethylene oxide and propylene oxide groups and the proportion of said ethylene oxide groups and propylene oxide groups is in each case at least 10% by weight, based on the overall amount of ethylene oxide and propylene oxide groups.

The invention also relates to the use of the aqueous polymer dispersions as binders in paints and anticorrosion coatings.

Aqueous polymer dispersions comprising an emulsifier having phosphate groups are known, for example, from DE-A-2743764, EP-A-421909 and EP-A-221498. DE-A-2743764 relates to polymer dispersions which are used in paints. The emulsifier is an alkanephosphoric acid or ester thereof. EP-A-421909 describes, inter alia, emulsifiers having phosphate groups and ethylene oxide groups. The polymer dispersions are used as binders for coating compositions. The anticorrosion coating materials of EP-A-221498 comprise a polymer with a copolymerized emulsifier. The emulsfier consists of a phosphate group, propylene oxide groups and an ethylenically unsaturated group.

EP-A-115468 discloses the use of a mixture of an emulsifier having phosphate groups and an emulsifier having ethylene oxide and propylene oxide groups.

The purpose of emulsifiers is to stabilize emulsifier monomer droplets and the polymer particles, obtained after polymerization, in the aqueous phase. The desired aim is of course to achieve a sufficient stabilization with the minimum quantity of emulsifier. Coagulation has to be avoided.

On subsequent use, the emulsifier remains in the coating composition and so also effects the properties of the resulting coating. In many cases, emulsifiers are responsible for the formation of bubbles and unevenness in the surface of the coating.

Where the composition is used as a binder for paints, the emulsifier is additionally desired to allow a high pigment concentration in the aqueous dispersion and to leave the pigment binding capacity of the polymer as high as possible. Low pigment binding capacity in the polymer leads to relatively poor mechanical stability in the coating and so, for example, to inadequate wet abrasion resistance.

In the case of anticorrosion coating materials an additional desire is for the emulsifier to contribute to the corrosion protection.

It is therefore an object of the present invention to provide emulsifiers which go as far as possible toward meeting the requirements regarding the stability of polymer dispersions and the surface quality of coatings produced from them. For paints utility, moreover, there is a desire for a high pigment binding capacity and, in the case of anticorrosion coating materials, for good corrosion protection.

We have found that this object is achieved by the aqueous polymer dispersions defined at the outset. We have also found that the aqueous polymer dispersions can be used as binders in paints and anticorrosion coatings.

The emulsifier present in the aqueous polymer dispersion is preferably a compound consisting at least 70% by weight of ethylene oxide and propylene oxide groups.

An essential feature of the emulsifier is that it comprises both ethylene oxide groups and propylene oxide groups.

The proportion of ethylene oxide groups is at least 10% by weight, preferably at least 40% by weight, based on the molar weight of the emulsifier.

The proportion of propylene oxide groups is at least 10% by weight, preferably at least 20% by weight, based on the molar weight of the emulsifier.

The molar weight of the emulsifier is preferably from 400 to 2000 and, with particular preference, from 600 to 1600 g/mol.

The emulsifier is preferably of the formula

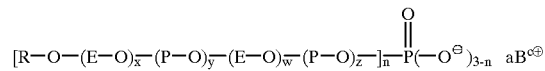

where

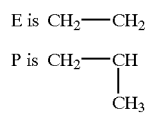

R is $C_1$–$C_{18}$-alkyl
x, y, w, z are each an integer from 0 bis 30,
x+w is at least 1
y+Z is at least 1
n is 1 or 2
B is a mono- or divalent cation
a, c are each 1 or 2 with a*c=3-n R is preferably $C_{10}$–$C_{16}$-alkyl. The sum x+w is preferably from 6 to 20 and, with particular preference, from 10 to 14. The sum y+z is preferably 2 to 10 and, with particular preference, from 3 to 7. Both w and z are preferably 0.

B is preferably a monovalent cation, especially of Na, K, $NH_3$ or H; accordingly, c=1 and a=1 or 2.

Compounds of this kind are obtainable, for example, under the trade name Lutensit® (BASF).

The aqueous polymer dispersion of the invention comprises the emulsifier preferably in amounts of from 0.1 to 5 parts by weight and, with particular preference, from 0.2 to 3 parts by weight per 100 parts by weight of polymer.

The polymer consists preferably of
a) from 40 to 100% by weight, preferably from 60 to 100% by weight and, with particular preference, from 80 to 100% by weight of at least 1 principal monomer and
b) from 0 to 40% by weight, preferably from 0 to 25% by weight, with particular preference from 0 to 15% by weight of further copolymerizable monomers.

Principal monomers a) are selected from $C_1$–$C_{20}$–alkyl (meth)acrylates, vinyl esters of carboxylic acids of up to 20 carbons, vinylaromatic compounds of up to 20 carbons, ethylenically unsaturated nitriles, vinyl halides, vinyl ethers of alcohols of 1 to 10 carbons, aliphatic hydrocarbons of 2 to 8 carbons and 1 or 2 double bonds, or mixtures of these monomers.

Examples that may be mentioned are $C_1$–$C_{10}$-alkyl (meth) acrylates, such as methyl methacrylate, methyl acrylate, n-butyl acrylate, ethyl acrylate and 2-ethylhexyl acrylate.

In particular, mixtures of the alkyl (meth)acrylates are also suitable.

Examples of vinyl esters of carboxylic acids with 1 to 2 carbons are vinyl laurate, stearate, propionate and acetate and also Versatic acid vinyl ester.

Suitable vinylaromatic compounds are vinyltoluene, α- and p-methylstyrene, α-butylstyrene, 4-n-butylstyrene, 4-n-decylstyrene and, preferably, styrene. Examples of nitriles are acrylonitrile and methacrylonitrile.

The vinyl halides are chloro-, fluoro- or bromo-substituted ethylenically unsaturated compounds, preferably vinyl chloride and vinylidene chloride.

Examples of vinyl ethers are vinyl methyl ether or vinyl isobutyl ether. Preference is given to vinyl ethers of alcohols of 1 to 4 carbons.

Hydrocarbons of 2 to 8 carbons and two olefinic double bonds that may be mentioned are butadiene, isoprene and chloroprene.

Suitable monomers (a) are preferably the alkyl (meth) acrylates, preferably $C_2$–$C_{10}$-alkyl acrylates and methacrylates, and the vinylaromatic compounds, and also mixtures of these compounds.

Very particular preference is given to methyl methacrylate, n-butyl acrylate, n-hexyl acrylate, octyl acrylate, 2-ethylhexyl acrylate and styrene, and also mixtures of these monomers, as monomers (a).

Further monomers b) are, for example, hydroxy-containing monomers, especially $C_1$–$C_{10}$-hydroxyalkyl (meth)acrylates, (meth)acrylamide, ethylenically unsaturated acids or acid anhydrides, especially carboxylic acids, such as (meth)acrylic acid or itaconic acid, or dicarboxylic acids, such as maleic acid or fumaric acid. Examples of further monomers b) also include crosslinking monomers, such as butanediol diacrylate or divinylbenzene.

The polymer can also be of multistage construction. In this case the stages differ in their monomer composition. The monomers of one stage are preferably polymerized to the extent of at least 80% by weight, with particular preference at least 90% by weight, based on the sum of the monomers of the respective stage, before beginning with the addition of the monomers of the next stage.

A multistage construction is not necessary in the context of the present invention. However, it has been observed that a multistage construction results in a lower minimum film-forming temperature with simultaneous good blocking resistance (virtually no sticking of coated substrates to one another on stacking).

Particular preference is given in this context to a two-stage construction.

The stages called I and II below contain preferably the following amount of monomers, based on the polymer:

I: from 5 to 80% by weight, with particular preference from 10 to 60% by weight

II: from 20 to 95% by weight, with particular preference from 90 to 40% by weight.

The monomer composition of the stages differs preferably in the glass transition temperature Tg, the Tg of the monomers of a stage being calculated by the method of FOX (FOX, Bull. Physics Soc. 1,3 (1956, p. 123)).

Preferably, the difference between the Tg of stage I and II is at least 5° C., with particular preference at least 10° C. However, the difference is generally no greater than 40° C.

Preferably, the more hydrophilic stage has the lower Tg: irrespective of whether it has been polymerized first or second, the more hydrophilic stage in the finished polymer is located on the outside, i.e., as the shell. The more hydrophobic stage generally forms the core.

Preferably, stage I is the more hydrophilic stage; that is, it is formed from monomers which in their totality are more hydrophilic than the monomers of stage II.

The polymer dispersions can be prepared conventionally from the monomers by emulsion polymerization techniques which are general knowledge, using the customary emulsifiers, dispersants and initiators.

Suitable dispersants for carrying out free-radical aqueous emulsion polymerizations are conventionally employed emulsifiers or protective colloids in amounts of from 0.1 to 5% by weight, in particular from 0.2 to 3% by weight, based on the monomers. As dispersant it is preferred to use solely the emulsifier A) described at the outset or mixtures of emulsifiers consisting at least 50% by weight, in particular at least 75% by weight, of emulsifier A).

Other common emulsifiers are, for example, alkali metal salts of higher fatty alcohol sulfates, such as sodium n-lauryl sulfate, ethoxylated $C_8$–$C_{10}$-alkylphenols with a degree of ethoxylation of from 3 to 30, and ethoxylated $C_8$–$C_{25}$ fatty alcohols with a degree of ethoxylation of from 5 to 50. Further suitable emulsifiers are given in Houben-Weyl, Methoden der organischen Chemie, Volume XIV, Makromolekulare Stoffe [Macromolecular substances], Georg Thieme Verlag, Stuttgart, 1961, pages 192 to 209.

Suitable protective colloids are natural substances of high molecular mass, such as starch, methylcellulose, pectins and gelatin, and synthetic substances, such as polyvinyl alcohol and polyvinylpyrrolidone. Further protective colloids are described at length in Houben-Weyl, op. cit., pages 411 to 420.

Suitable polymerization initiators are all those capable of triggering a free-radical emulsion polymerization in aqueous media. They are generally employed in amounts of from 0.1 to 10% by weight, preferably from 0.2 to 4% by weight, based on the monomers. Customary compounds are inorganic peroxides, such as sodium and ammonium peroxodisulfates and hydrogen peroxide, organic peroxides, such as dibenzoyl peroxide or tert.-butyl hydroperoxide and azo compounds, such as azodiisobutyronitrile. These initiators are suitable for the customary reaction temperatures for free-radical emulsion polymerizations: from 50 to 100° C. Where lower reaction temperatures are desired, of about 40 to 60° C., redox systems, such as combinations of per compounds and a reductive coinitiator, are preferred over the sodium salt of the hydroxymethanesulfinic acid, ascorbic acid or iron(II) salts.

The preparation of aqueous polymer dispersions by the technique of free-radical emulsion polymerization is conventional. (cf. Houben-Weyl, op. cit., page 133 ff.).

It has been found particularly suitable to employ a feed technique, starting from an initial charge consisting of a portion of the monomers, generally up to 20% by weight, water, emulsifier and initiator. The remainder of the monomers and any regulators, in emulsified form, and, in addition, an aqueous solution of further polymerization initiators, are added in accordance with the progress of polymerization.

Where the emulsifier A), or the total amount of emulsifier A) desired, is not used as dispersant during the emulsion polymerization, the desired amount of emulsifier A) can also be added subsequently to the aqueous polymer dispersion obtained.

Preferably, the emulsifier A) is used as an emulsifier in the emulsion polymerization as described above. The use of other dispersants is unnecessary.

The aqueous polymer dispersion of the invention preferably has a solids content of from 35 to 65 and, with particular preference, from 45 to 55% by weight.

The glass transition temperature $T_g$ of the copolymers is preferably within the range from −60 to 140° C. and, with particular preference, within the range from 0 to 70° C. (calculated in accordance with Fox, Bull. Physics Soc. 1, 3 (1956), p.123).

The polymer dispersion of the invention is notable for high stability with virtually no coagulation.

The polymer dispersion of the invention can be used as a binder for coating compositions, such as for lacquers, protective coatings, paper slips, decorative coatings, paints, adhesives, coatings on textiles, and as binders for unbonded fiber nonwovens.

Appropriate auxiliaries can be added for the various utilities, examples being flow control agents, thickeners, defoamers, fillers, pigments, dispersing auxiliaries for pigments etc. The coatings can be obtained by applying the coating compositions to appropriate substrates, such as metal, plastic, wood, paper and textiles, and by drying, if appropriate, at ambient or elevated temperature.

The coatings obtained feature a uniform surface and, in particular, freedom from bubbles.

The polymer dispersion of the invention is particularly suitable as a binder for anticorrosion coating materials and for paints.

In the case of anticorrosion coating materials, it is preferred to use polymer dispersions of the invention having a $T_g$ of from 20 to 60° C.

In addition to the polymer dispersion the anticorrosion materials may also include anticorrosion agents, such as corrosion inhibitors or active anticorrosion pigments, such as zinc phosphate.

Even without further anticorrosion agents, the polymer dispersion of the invention has a good corrosion protection effect.

In the case of paints, it is preferred to use polymer dispersions of the invention having a $T_g$ of from −55 to 90° C., with particular preference from −10 to 80° C. and, with very particular preference, from 0 to 60° C.

Paints, and especially emulsion paints, are one of the largest product groups of the paints and coatings industry (see Ullmanns Enzyklopädie der technischen Chemie, 4th ed., Volume 15, Verlag Chemie, Weinheim 1978, p. 665). Emulsion paints generally include a film-forming polymer as binder and at least one inorganic pigment as colorant, as well as inorganic fillers and auxiliaries, such as defoamers, thickeners, wetting agents and, if appropriate, film-forming auxiliaries.

The quality of emulsion paints is critically determined by the ability of the film-forming polymer to carry out uniform binding of the nonfilm-forming constituents, the pigments and inorganic fillers. The pigment binding capacity of the binder plays a particularly important part in emulsion paints having a high content of inorganic pigments and fillers, characterized by a pigment volume concentration (p.v.c.) of >40%. The p.v.c. is usually defined as the quotient of the overall volume of the solid inorganic constituents (pigment+fillers) divided by the overall volume of the solid inorganic constituents (pigments and fillers) and of the polymer particles of the aqueous binder polymer dispersion; see Ullmanns Enzyklopädie der technischen Chemie, 4th edition, Vol. 15, p. 668). A low pigment binding capacity leads to poor mechanical stability of the coating, which is manifested, for example, in low wet abrasion resistance. High wet abrasion resistance, however, is required in particular for washable emulsion paints. It is also necessary to ensure that the binder has a sufficiently low film-forming temperature to allow the coating composition to be processed even at low temperatures. At the same time, the binder polymer must not be too soft, so as to ensure sufficient strength, or too tacky, so as to prevent soiling.

A further important property of emulsion paints is the blocking resistance of the coatings, by which is meant minimal sticking of the coating film to itself under pressure and elevated temperature (good blocking resistance).

The paints (emulsion paints) of the invention comprise pigments and fillers, preferably in amounts such that the p.v.c. is from 15 to 85% and, with particular preference, from 25 to 55%.

Examples of typical pigments are titanium oxide, preferably in the rutile form, barium sulfate, zinc oxide, zinc sulfate, basic lead carbonate, antimony trioxide, and lithopones (zinc sulfide+barium sulfate). However, the emulsion paints may also comprise color pigments, such as iron oxides, carbon black, graphite, luminescent pigments, zinc yellow, zinc green, ultramarine, manganese black, antimony black, manganese violet, Paris blue or Schweinfurt green. In addition to the inorganic pigments, the emulsion paints of the invention may also include organic color pigments, examples being sepia, gamboge, Cassel brown, toluidene red, para red, Hansa yellow, indigo, azo dyes, anthraquinonoid and indigooid dyes, and also dioxazine, quinacridone, phthalocyanine, isoindolinone and metal complex pigments.

Suitable fillers include alumosilicates, such as feldspars, silicates, such as kaolin, talc, mica, magnesite, alkaline earth metal carbonates, such as calcium carbonate, in the form of calcite or chalk, for example, magnesium carbonate, dolomite, alkaline earth metal sulfates, such as calcium sulfate, silica, etc. The fillers can be employed as individual components although it has been found in practice that filler mixtures, such as calcium carbonate/kaolin or calcium carbonate/talc, are particularly suitable.

To increase the hiding power and to save on the use of white pigments it is common to employ finely divided extenders, such as finely divided calcium carbonate or mixtures of various calcium carbonates with different particle sizes. To adjust the hiding power, the shade and depth of color, it is preferred to employ blends of color pigments and extenders.

The emulsion paints of the invention are stable fluid systems which can be used to coat a host of substrates. Examples of suitable substrates are wood, concrete, metal, glass, ceramics, plastic, plasters, wall coverings, and coated, primed or weathered substrates.

The coatings produced using the emulsion paints of the invention are notable for high wet abrasion resistance and good adhesion in the wet state. Moroever, the coatings are not tacky, and feature high blocking resistance.

EXAMPLES

I Preparing Polymer Dispersions for Anticorrosion Coatings

The emulsifier was dissolved in water and the solution was adjusted to pH=9 with ammonia. The initial charge was heated to 85° C. under nitrogen in a polymerization vessel equipped with anchor stirrer, reflux condenser and 2 feed ports, and initial polymerization was carried out for 15 minutes. Then feed stream 1 was metered in over 2 hours and feed stream 2 over 2¼hours. Polymerization was then continued for 1 hour. In the case of Examples C2 and 2, feed stream 3 was subsequently metered in over the course of 10 minutes. The batch was then filtered through a sieve of mesh size 500 μm and the proportion of coagulum in the wet state was determined by weighing.

Emulsifier A: alkylaryl polyglycol ether phosphate, mixture of mono- and diphosphates (contains only EO units, for comparison).

Emulsifier B: $C_{13/15}$—$[EO]_{12}$—$\{PO\}_5$—$PO_3H_2$, mixture of mono- and diphosphates.

EXAMPLES

TABLE 1

Synthesis of the polymer dispersions

|  | C1 (comparative) | 1 | C2 (comparative) | 2 |
|---|---|---|---|---|
| Initial charge | | | | |
| Emulsifier type | A | B | A | B |
| Emulsifier amount | 1.5 g | 1.5 g | 1.9 g | 1.9 g |
| Water | 250 g | 250 g | 350 g | 350 g |
| Portion of feed stream 1 | 36 g | 36 g | 46.5 g | 46.5 g |
| Portion of feed stream 2 | 5 g | 5 g | 4 g | 4 g |
| Feed stream 1 | | | | |
| Emulsifier type | A | B | A | B |
| Emulsifier amount | 8.5 g | 8.5 g | 10.6 g | 10.6 g |
| Water | 200 g | 200 g | 280 g | 280 g |
| Acrylamide (50% strength in water) | 15 g | 15 g | 18.8 g | 18.8 g |
| Acrylic acid | 12.5 g | 12.5 g | 15.6 g | 15.6 g |
| Styrene | 242 g | 242 g | 303 g | 303 g |
| n-butyl acrylate | 237 g | 237 g | 297 g | 297 g |
| Feed stream 2 | | | | |
| Na peroxodisulfate | 2.5 g | 2.5 g | 3.1 g | 3.1 g |
| Water | 98 g | 98 g | 78 g | 78 g |
| Feed stream 3 | | | | |
| Aqueous ammonia solution [25% strength] | — | — | 8 g | 8 g |
| Coagulum content [%] | 0.3 | 0.1 | <0.1 | <0.1 |
| Dispersion characteristics: | | | | |
| Solids content [%] | 48.2 | 48.1 | 46.8 | 47.2 |
| pH | 3.8 | 3.8 | 7.1 | 6.3 |
| LT* (measure of particle size) | 75 | 69 | 75 | 64 |
| Viscosity [mPas] | 100 | 120 | 660 | 600 |

*LT = Turbidity of dispersions with polymer content of 0.01% by weight in relation to water, determined by measuring the photocurrent. The figure given is the light transmittance in %. The higher the LT the smaller the polymer particles.

II Preparing the Anticorrosion Coating Materials

The anticorrosion coating materials are prepared in accordance with the following table.

TABLE 2

Preparation of the anticorrosion coating materials
(Parts are by weight)

|  | C1 | 1 | C2 | 2 |
|---|---|---|---|---|
| Polymer dispersion (liquid) | 103.7 | 104.2 | 96.1 | 95.2 |
| Water | 10.6 | 10.6 | — | — |
| Corrosion inhibitor | 0.4 | 0.4 | — | — |
| Surfynol 104 (50% strength in n-propanol)[1] | — | — | 1.2 | 1.2 |
| Agitan 260[2] | — | — | 0.6 | 0.6 |
| Water | — | — | 11.7 | 11.7 |
| Pigment disperser (LR 8807)[3] | — | — | 1.46 | 1.46 |
| Pigment disperser (Collacral AS 35)[4] | 0.8 | 0.8 | — | — |
| aq. ammonia solution (25% strength) | 3.2 | 8.65 | 3.3 | 3.2 |
| Solvenon PP[5] | 1.85 | 1.85 | — | — |
| Petroleum spirit 180–210° C.[6] | 1.85 | 1.85 | — | — |
| Agitan 295[7] | 0.6 | 0.6 | — | — |
| Lithopone L, 30% ZnS[8] | 32.7 | 32.7 | — | — |
| Heucophos ZPZ[9] | 21.025 | 21.025 | — | — |
| Talc 20M 2[10] | 9.225 | 9.225 | — | — |
| Bayferrox 130M[11] | 21.775 | 21.775 | 29.9 | 29.9 |
| Millicarb[12] | — | — | 47.8 | 47.8 |
| Aerosil 200[13] | — | — | 0.48 | 0.48 |
| Glass beads are added to the ingredients and the mixture is stirred in a dissolver for 20 minutes. Then the following items are incorporated by stirring: | | | | |
| Polymer dispersion (liquid) | 44 | 44.2 | 47.5 | 47.1 |
| Agitan 260 | — | — | 0.6 | 0.6 |
| Agitan 295 | 0.45 | 0.45 | — | — |
| Aqueous ammonia solution (25% strength) | 5.6 | 2.9 | 1.1 | 0.8 |
| Solvesso 100[14] | — | — | 3.4 | 3.4 |
| Buty glycol[15] | 3.7 | 3.7 | — | — |
| Polyether thickener (Collacral PU 85, 25%) | 0.3 | 1.9 | 0.3 | 0.3 |
| After waiting for 1 day, the coating material is adjusted to the desired viscosity of about 300 mPas by adding water: | | | | |
| Water | 33.7 | 62.8 | 17 | 20.8 |

1 Defoamer from Air Products
2 Defoamer from Münzing Chemie
3 Pigment dispersing auxiliary from BASF AG
4 Pigment dispersing auxiliary from BASF AG
5 Film-forming auxiliary from BASF AG
6 Film-forming auxiliary
7 Defoamer from Münzing Chemie
8 Active anticorrosion pigment from Sachtleben
9 Active anticorrosion pigment from Heubach
10 Filler from Luzenac
11 Iron oxide from Bayer AG
12 Fillers (CaCO$_3$) from Omya
13 Filler (silicate) SiO$_2$ from Degussa
14 and 15 film-forming auxiliaries III Testing the Anticorrosion Coatings The coating materials prepared in this way were applied to steel panels by spraying with the aid of a manual spray gun, the dried film thickness of the coating material being 80 μm. The coated panels were dried at room temperature for 7 days and then at 50° C. for 1 day. The panel substrate was sheet iron (St 1405) (cleaned with ethyl acetate). The quality of the dried coating was assessed with the aid of a Zeiss stereomagnifier. The salt spray test was carried out in accordance with DIN 53 167. The results are summarized in the Table below:

TABLE 3

Test results: Film thickness: 80 μm (dry).

|  | C1 | 1 | C2 | 2 |
|---|---|---|---|---|
| Emulsifier type | A | B | A | B |
| Assessment of the coating surfaces with the stereomagnifier | Strewn with microcoagulum, hence no further testing | Satisfactory | Satisfactory | Satisfactory |
| Assessment of the coated panels after 48 h | | | | |

TABLE 3-continued

Test results: Film thickness: 80 μm (dry).

|  | C1 | 1 | C2 | 2 |
|---|---|---|---|---|
| of salt spray testing: |  |  |  |  |
| Blisters [%] |  |  | 25 | 15 |
| Subfilm corrosion [Rating] |  |  | 3 | 0 |

Assessment
Subfilm Corrosion
Rating 0–5
0=no subfilm corrosion
5=severe subfilm corrosion
Blisters: figure indicates % of surface which exhibits blisters.

The anticorrosion coating materials based on the binders of the invention display better stability (no coagulum formed on formulation or application) and, in the salt spray test, reduced blistering and less subfilm corrosion.

IV Preparing Polymer Dispersions for Paints
Abbreviations
BA=n-butyl acrylate
MMA=methyl methacrylate
MAA=methacrylic acid
UMA=ureidomethacrylate
NaPS=sodium persulfate
tBHP=tert-butyl hydroperoxide
ABS=acetone bisulfate
E1=Dowfax 2A1, sodium dodecylphenoxybenzenedisulfonate (trade mark of Dow Chemicals)
E2=Disponil FES 77, alkyl($C_{10-16}$)ethoxy(EO)sulfonates, sodium salt (trade mark of Henkel KGaA)
Emulsifier B (see above, of the invention).

The initial charge as in Table 4 was heated to 85° C. under nitrogen in a polymerization vessel and then a portion of feed stream 2 was added. Feed stream 1 was metered in continuously thereafter over 3 hours and the remaining initiator solution over 4 hours, and then polymerization was continued for 1 hour more. The batch was subsequently cooled to 60° C., admixed with 6.35 g of tBHP (15% in water) and 7.25 g of ABS (13.1% in water) to reduce the residual monomer content, and held at 60° C. for 1 hour more. It was then cooled and adjusted to a pH of 7.4.

TABLE 4

Preparation of the polymer dispersions

|  | C3 (comparative) | 3 |
|---|---|---|
| Initial charge |  |  |
| Water | 234 g | 234 g |
| Polystyrene seed (33%) | 4.61 g | 4.61 g |
| Na pyrophosphate (5%) | 38 g | 38 g |
| Portion of feed stream 2 | 7.24 g | 7.24 g |
| Feed stream 1 |  |  |
| E 1 (45% strength in water) | 21.11 | 21.11 |
| E 2 (30% in water) | 47.5 | — |
| Emulsifier B | — | 14.21 |

TABLE 4-continued

Preparation of the polymer dispersions

|  | C3 (comparative) | 3 |
|---|---|---|
| Water | 227.7 g | 238.5 g |
| Methacrylic acid | 19 g | 19 g |
| MMA | 356.25 g | 356.25 g |
| BA | 502.55 g | 502.25 g |
| UMA (25% in MMA) | 72.2 g | 72.2 g |
| Feedstream 2 |  |  |
| Na peroxodisulfate | 2.38 g | 2.38 g |
| Water | 70 g | 95 g |
| Coagulum content [%] | 0 | 0 |
| NaOH (10% strength) | 13.1 g | 38.7 |
| Solids content [%] | 60.1 | 51.2 |
| pH | 7.4 | 8.8 |
| particle size (nm) | 270 | 377 |
| MFT (° C.) | 5 | <2 |

The minimum film-forming temperature (MFT) of the polymer dispersions was determined in accordance with Ullmanns Enzyklopädie der technischen Chemie, 4th ed. Vol. 19, VCH Weinheim 1980, p. 17. The measuring device used was a film forming bench (a metal plate to which a temperature gradient is applied and to which temperature sensors are fitted at various points for temperature calibration, the temperature gradient being chosen such that one end of the film-forming bench has a temperature above the expected MFT and the other end has a temperature below the expected MFT). The aqueous polymer dispersion is then applied to the film-forming bench. In the regions of the film-forming bench whose temperature lies above the MFT a clear film is formed on drying, whereas in the cooler areas a white powder is formed. The MFT is determined visually on the basis of the known temperature profile of the plate.

V. Preparing the Emulsion Paints

1. Emulsion Paints with a Pigment Volume Concentration (p.v.c.) of 46.9%

A vessel was charged with the following constituents:

| | |
|---|---|
| 105.60 g | water |
| 2.00 g | thickener[1] |
| 0.80 g | 2-amino-2-methylpropanol with 5% water |
| 1.00 g | dispersant[2] |
| 3.40 g | 10% strength by weight aqueous tetrapotassium pyrophosphate solution |
| 1.70 g | commercial biocide[3] |
| 3.40 g | commercial defoamer[4] |
| 10.10 g | propylene glycol |
| 10.10 g | dipropylene glycol-n-butyl ether |
| 190.10 g | titanium dioxide pigment[5] |
| 181.60 g | feldspar[6] |
| 50.70 g | calcined kaolin[7] |

The constituents were mixed for 20 minutes in a high-speed disperser. The following constituents were then added with stirring:

| | |
|---|---|
| 266.01 g | polymer dispersion 3 or C3 (60.1% by weight) |
| 2.50 g | commercial defoamer[4] |

-continued

| 11.80 g | commercial thickener[8] |
| 159.00 g | water |

The performance properties of the emulsion paints are compiled in Table 1.

1) Hydroxyethylcellulose with a viscosity of 30 Pas (determined as 2% strength solution in water at 25° C.); Natrosol® 250 HR from Hercules GmbH, Düsseldorf, Germany.
2) 30% strength by weight aqueous solution of an ammonia polyacrylate; Pigmentverteiler A from BASF AG, Ludwigshafen, Germany.
3) Proxel®GXL from Zeneca GmbH, Frankfurt, Germany.
4) Foammaster®S from Henkel KGaA, Düsseldorf, Germany.
5) Kronos®2101 from Kronos, Houston, Tex., USA.
6) Minex®4 from Unimin Speciality Minerals Inc., Elco, Ill., USA; average particle size 7.5 $\mu$m
7) Icecap® from Burgess Pigment Co., Sandersville, Ga., USA.
8) 20% strength by weight solution of an associatively thickening polyurethane, Acrysol RM 202 from Rohm and Haas Deutschland GmbH, Frankfurt, Germany.

VI. Determining the Performance Properties

1. Abrasion Resistance

The abrasion resistance was determined in accordance with ASTM D 2486 using a Gardner abrasion machine and a standardized abrasive medium (abrasive type SC-2).

The emulsion paints were applied with a box-type coating bar (gap height 175 $\mu$m, 7 MIL) to Leneta sheets. The sheets were then dried in a climatically controlled chamber for 14 days under standard climatic conditions (23° C., 50% relative atmospheric humidity). The dry film thickness was about 50 $\mu$m.

For each emulsion paint, the abrasion test was carried out on three sheets. For this purpose, a metal strip 250 $\mu$m thick was placed underneath the center of the sheet. Abrasive paste was then applied, and abrasion was performed with a nylon brush until the coating had been abraided right through at the point lying above the metal. The parameter indicated is the number of double strokes required to bring about this complete abrasion at 1 point. It is stated as the average of two values which deviated by less than 25% from one another.

2. Blocking Resistance

The blocking resistance was determined in accordance with ASTM D 4946. For this purpose the emulsion paints were applied with a box-type coating bar (3 MIL, gap height 75 $\mu$m) to Leneta sheets. The sheets were then dried for 24 hours under standard climatic conditions. The dried and coated sheets were subsequently cut into 3.8 cm squares. The squares were placed on top of one another with the coated sides facing and were inserted between two glass plates. A weight of 2 kg was placed on top of these glass plates. This arrangement was stored at 50° C. for 24 hours. The sheets were then investigated for their parting behavior. The results were based on rating scale from 0 to 10:

0=75 to 100% tearing of the coating
1=50 to 75% tearing
2=25 to 50% tearing
3=5 to 25% tearing
4=very tacky: 0 to 5% tearing;
5=moderate tack
6=slight tack
7=slight to very slight tack
8=extremely slight tack
9=barely any tack
10=no tack 3. Wet Adhesion The wet adhesion was determined as follows: in a first step the Leneta sheets were coated with a solventborne alkyd resin lacquer (Glasurit EA, high-gloss lacquer from BASF deco GmbH, Cologne, Germany) using a box-type coating bar (gap height 180 $\mu$m). The sheets were dried for 24 hours in a standard-climate chamber and then in an oven at 50° C. for 14 days. The emulsion paints were then applied to the resin-coated Leneta sheets as a second coating, using an applicator (gap height 250 $\mu$m, 10 MIL). The resulting sheets were dried under standard climatic conditions for 3 days. Three test specimens were cut out from each sheet. Each test specimen was scribed horizontally using a razor blade, and then a freeze/thaw test was conducted. For this test, the specimens were wetted with water and stored in a deep-freeze at −20° C. for 16 hours. This procedure was repeated twice. The samples were then allowed to warm to room temperature, and were subsequently wetted with water again for 10 minutes. The adhesion of the coating at the scribe mark was assessed as scratching with the fingernail, on the basis of a rating scale of 0 to 5, where 0 is optimum adhesion and 5 denotes no adhesion (flawless removal). The ratings 1 to 4 denote intermediate values.

TABLE 5

| | Results | | |
| Dispersion | Blocking resistance | Wet adhesion | Wet abrasion resistance |
| --- | --- | --- | --- |
| 3 | 10 | 2–3 | 1800 |
| C3 | 10 | 2–3 | 1200 |

We claim:

1. An aqueous polymer dispersion comprising from 0.1 to 10 parts by weight per 100 parts by weight of polymer of an emulsifier A) having a phosphate group, wherein said emulsifier consists at least 50% by weight of ethylene oxide and propylene oxide groups and the proportion of the ethylene oxide groups and propylene oxide groups is in each case at least 10% by weight, based on the overall amount of the ethylene oxide and propylene oxide groups, said emulsifier A) having the formula

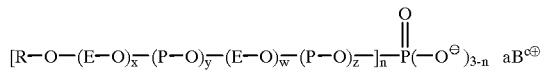

where

E is CH$_2$—CH$_2$
P is CH$_2$—CH
           |
           CH$_3$

R is C$_1$–C$_{18}$-alkyl
x,y,w,z are each an integer from 0 bis 30,
x+w is at least 1 y+z is at least 1 n is 1 or 2

B is a mono- or divalent cation a,c are each 1 or 2 with a*c=3−n.

2. A dispersion as claimed in claim 1, wherein the molecular weight of the emulsifier is from 400 to 2000 g/mol.

3. A dispersion as claimed in claim 1, wherein the emulsifier consists at least 10% by weight of ethylene oxide groups and at least 10% by weight of propylene oxide groups.

4. A dispersion as claimed in claim 1, wherein the polymer consists 40 to 100% by weight of principal monomers selected from $C_1$–$C_{20}$-alkyl(meth)acrylates, vinyl esters of carboxylic acids of up to 20 carbons, vinylaromatic compounds of up to 20 carbons, ethylenically unsaturated nitriles, vinyl halides, vinyl ethers of alcohols of 1 to 10 carbons, and aliphatic hydrocarbons of 2 to 8 carbons and 1 or 2 double bonds.

5. A method of coating a substrate with a coating composition, comprising applying said coating composition with the dispersion as claimed in claim 1 as a binder for said coating composition.

6. A method for painting a substrate with a paint, comprising painting said substrate with a paint comprising a dispersion as claimed in claim 1 as a binder for said paint.

7. A paint comprising a dispersion as claimed in claim 1.

8. A method for coating a substrate with an anticorrosion coating material, comprising applying said anticorrosion coating material with a dispersion as claimed in claim 1 as a binder in said anticorrosion coating material.

9. An anticorrosion coating material comprising a dispersion as claimed in any of claims 2 to 4 and 1.

* * * * *